United States Patent
Johnson et al.

(10) Patent No.: US 9,016,764 B2
(45) Date of Patent: Apr. 28, 2015

(54) VEHICLE CARGO BED ACCESSORY

(71) Applicant: Nissan North America, Inc., Franklin, TN (US)

(72) Inventors: Randall Johnson, White Lake, MI (US); Bruce Pfeiffer, Livonia, MI (US); Ian Patterson, Novi, MI (US); Ronald Morrow, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 14/019,153

(22) Filed: Sep. 5, 2013

(65) Prior Publication Data

US 2015/0061319 A1 Mar. 5, 2015

(51) Int. Cl.
*B62D 25/00* (2006.01)
*B60R 9/06* (2006.01)
*B62D 33/023* (2006.01)
*B60R 9/00* (2006.01)

(52) U.S. Cl.
CPC *B62D 33/023* (2013.01); *B60R 9/00* (2013.01)

(58) Field of Classification Search
CPC ............ B62D 33/0273; B62D 25/2054; B60P 7/0815; B60P 1/435; B60P 3/07; B60P 3/14; B60P 7/14; B60J 5/0495; B60R 13/01; B60R 5/041; B61D 45/001
USPC ......... 296/183.1, 37.6, 33, 39.2, 50, 57.1, 61; 49/383; 410/104, 150, 129–139
See application file for complete search history.

(56) References Cited

U.S. PATENT DOCUMENTS

| | | | |
|---|---|---|---|
| 3,004,678 A | 10/1961 | Golaski | |
| 4,131,378 A | 12/1978 | Daws | |
| 4,763,945 A | 8/1988 | Murray | |
| 5,188,415 A * | 2/1993 | Wagner | 296/57.1 |
| 5,516,185 A * | 5/1996 | O'Donnell et al. | 296/166 |
| D374,854 S * | 10/1996 | Little et al. | D12/400 |
| 5,664,822 A | 9/1997 | Rosenfield | |
| 5,904,391 A | 5/1999 | Liljenquest et al. | |
| 6,293,602 B1 * | 9/2001 | Presley | 296/26.11 |
| 6,540,278 B2 | 4/2003 | Presley | |
| D488,115 S | 4/2004 | Trunk et al. | |
| 6,846,140 B2 | 1/2005 | Anderson et al. | |
| 7,214,018 B2 | 5/2007 | Lussier | |
| 7,594,787 B2 | 9/2009 | Womack et al. | |
| 7,819,295 B2 | 10/2010 | Plavetich | |
| 2008/0219795 A1 | 9/2008 | Anderson et al. | |
| 2008/0298923 A1 | 12/2008 | Kovie | |
| 2012/0222357 A1 | 9/2012 | Elliott et al. | |
| 2012/0223541 A1 | 9/2012 | Gianino | |

FOREIGN PATENT DOCUMENTS

| | | |
|---|---|---|
| JP | 59-014581 A | 1/1984 |
| WO | 2009008038 A1 | 1/2009 |

* cited by examiner

*Primary Examiner* — Glenn Dayoan
*Assistant Examiner* — Sunsurraye Westbrook
(74) *Attorney, Agent, or Firm* — Global IP Counselors, LLP

(57) ABSTRACT

A vehicle cargo bed accessory includes a vehicle cargo area with a bed floor, an accessory attachment track attached to the bed floor, a tailgate and a tailgate gap cover. The tailgate has a first end pivotally attached to a rear of the vehicle cargo area for pivoting movement between a closed position covering the tailgate opening and an open position exposing the tailgate opening. A gap is defined between a rear end of the bed floor and the first end of the tailgate. The tailgate gap cover is coupled to the accessory attachment track proximate the rear end and is movable to pivot between a horizontal orientation with the tailgate in the open position and an upright orientation with the tailgate in the closed position. The tailgate gap cover covers the gap.

19 Claims, 11 Drawing Sheets

VEHICLE CARGO BED ACCESSORY

BACKGROUND

1. Field of the Invention

The present invention generally relates to a vehicle cargo bed structure and accessory. More specifically, the present invention relates to a vehicle cargo bed structure and accessory where the tailgate accessory covers a gap between the cargo bed and a tailgate.

2. Background Information

A vehicle such as a pick-up truck typically includes a cargo bed and a tailgate that pivotally moves between an upright closed position and an inclined open position. In order for the tailgate to move between the open position and the closed position, a pivoting end of the tailgate is slightly spaced apart from an adjacent end of the cargo bed. Consequently a gap is defined between the pivoting end of the tailgate and the adjacent end of the cargo bed. When the cargo bed is used to haul small material, such as gravel, stone or dirt, this small material can become lodged in the gap between the tailgate and the cargo bed.

SUMMARY

One object of the disclosure is to provide a vehicle cargo bed that includes a tailgate with a cover that can move between an upright position and an inclined position with movement of the tailgate in order to cover a gap between the cargo bed and the tailgate.

In view of the state of the known technology, one aspect of the disclosure is a vehicle cargo bed structure and tailgate accessory that has a vehicle cargo area including a bed floor, a first side cargo wall and a second side cargo wall, with a tailgate opening being defined at rearward ends of the first and second cargo walls. An accessory attachment track is attached to the bed floor. The accessory attachment track extends in a vehicle longitudinal direction. A tailgate has a first end pivotally attached to a rear of the vehicle cargo area for pivoting movement between a closed position covering the tailgate opening between the first side cargo wall and the second side cargo wall and an open position exposing the tailgate opening. A gap is defined between a rear end of the bed floor and the first end of the tailgate. A tailgate gap cover is coupled to the accessory attachment track proximate the rear end. The tailgate gap cover is movable to pivot between a horizontal orientation with the tailgate in the open position and an upright orientation with the tailgate in the closed position. The tailgate gap covers the gap with the tailgate in the open position.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
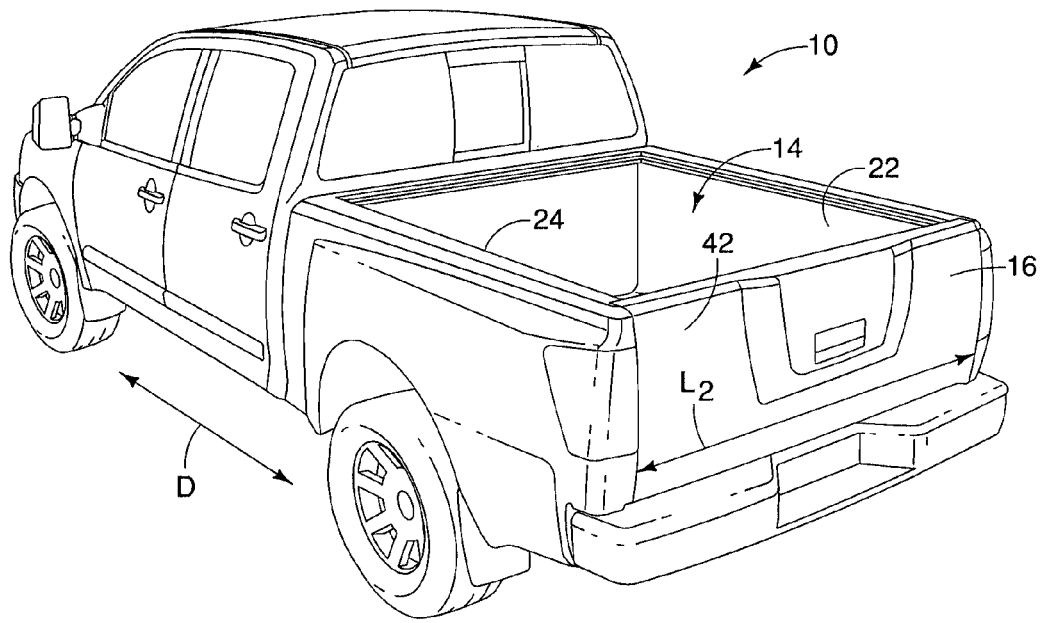
FIG. 1 is a perspective view of a vehicle that includes a cargo area in accordance with the various embodiments.
Figure 2:
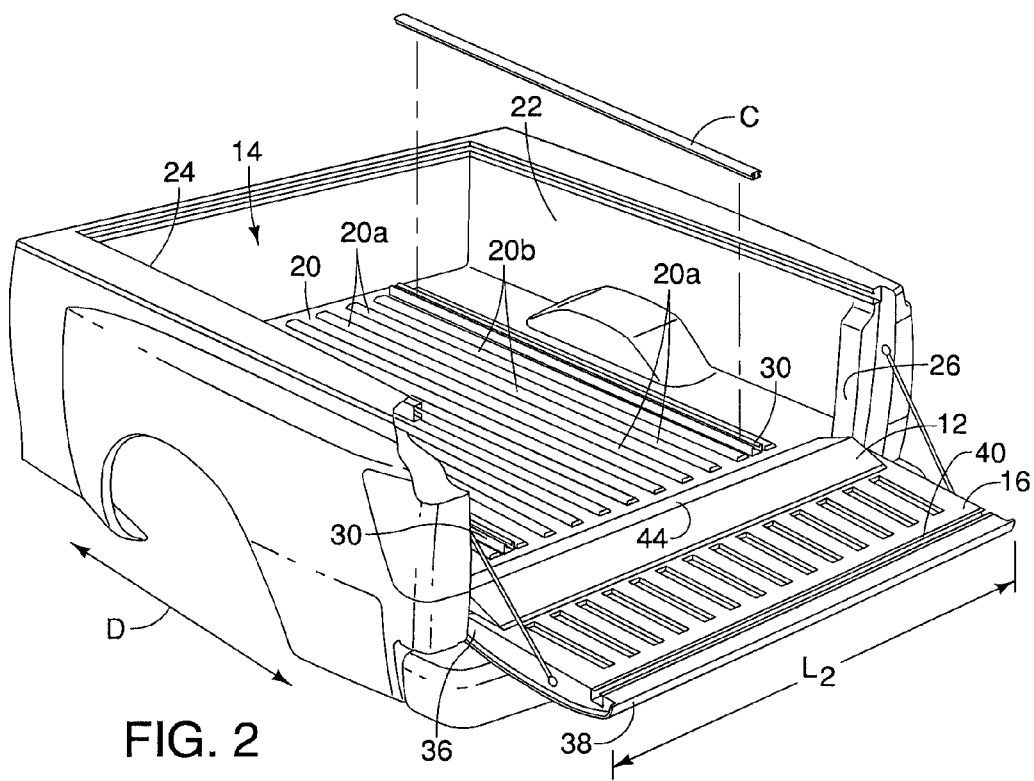
FIG. 2 is a perspective view of the cargo area showing a bed floor with accessory attachment tracks, a tailgate in an open position and a tailgate gap cover in accordance with a first embodiment.

Referring initially to FIGS. 1 and 2, a vehicle 10 that includes a tailgate gap cover 12 (FIG. 2) is illustrated in accordance with a first embodiment. As is described in greater detail below, the tailgate gap cover 12 is an accessory that covers a gap G (FIGS. 3 and 4) defined between a cargo area 14 and a tailgate 16 of the vehicle 10.

Figure 3:
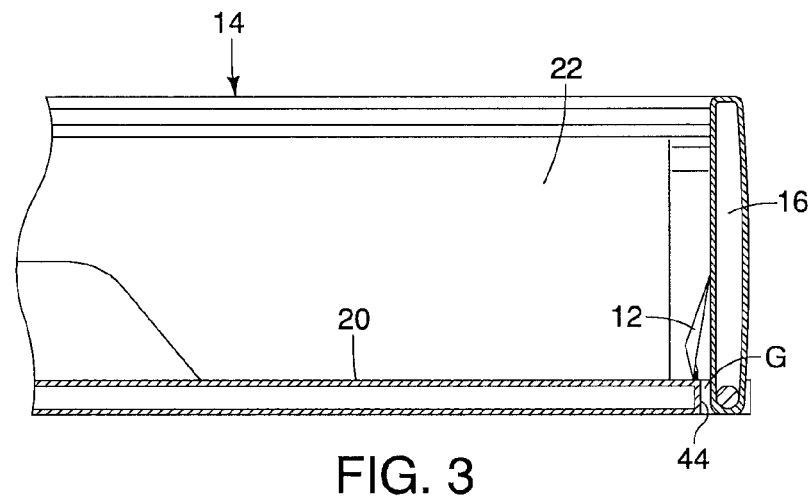
FIG. 3 is a side view of the cargo area showing the tailgate in a closed position with the tailgate gap cover in an upright orientation in accordance with the first embodiment.
Figure 4:
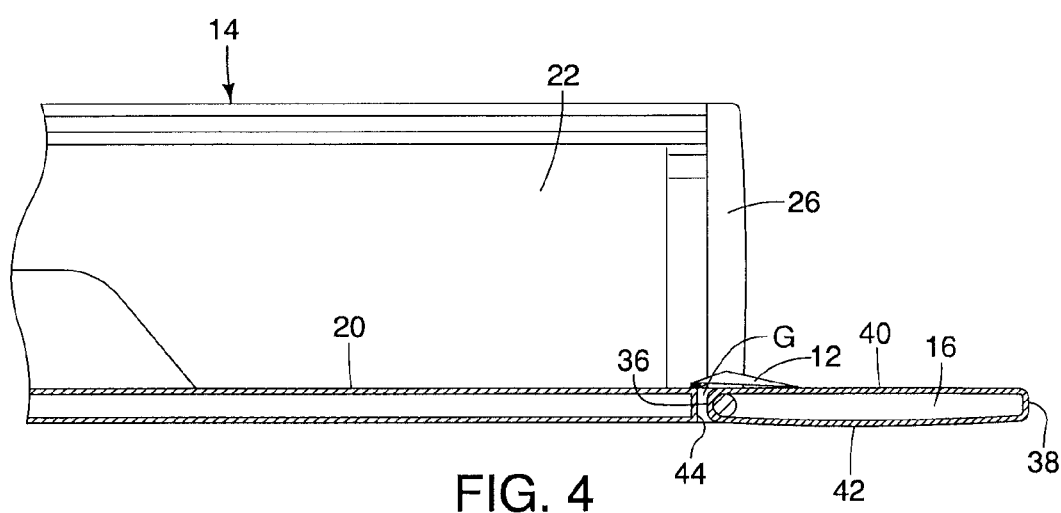
FIG. 4 is another side view of the cargo area similar to FIG. 3 showing the tailgate in an open position with the tailgate gap cover in a horizontal orientation in accordance with the first embodiment.

Before describing the tailgate gap cover 12, a description of the cargo area 14 is provided with specific reference to FIGS. 2-4. The cargo area 14 basically includes a bed floor 20, a first side cargo wall 22 and a second side cargo wall 24, with a tailgate opening 26 being defined between rearward ends of the first cargo wall 22 and second cargo wall 24.

Figure 7:
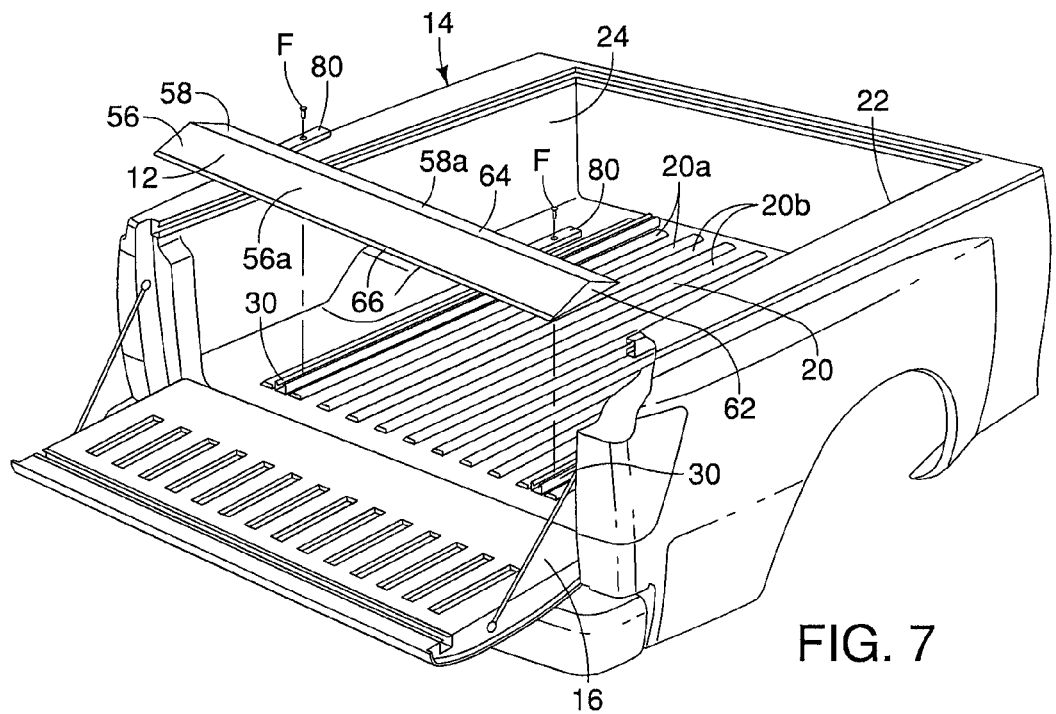
FIG. 7 is a perspective exploded view of the cargo area showing the installation of the tailgate gap cover to the accessory attachment tracks on the bed floor of the cargo area in accordance with the first embodiment.

The bed floor 20 has a generally flat overall contour, except that a plurality of upwardly projecting ribs 20*a* are embossed or molded into the sheet metal that forms the bed floor 20 to provide greater rigidity and cargo-carrying strength to the bed floor 20. A plurality of recesses 20*b* is defined between each adjacent pair of ribs 20*a*. Two utility tracks or accessory attachment tracks 30 are fastened to the bed floor 20 such that the accessory attachment tracks 30 extend in a vehicle longitudinal direction D. Each accessory attachment track 30 is located between adjacent pairs of the ribs 20*a* within a corresponding one of the recesses 20*b*. One accessory attachment track 30 is located near but spaced apart from the first side cargo wall 22 and the other accessory attachment track 30 is located near but spaced apart from the second side cargo wall 24, as shown in FIGS. 2 and 7. The first side cargo wall 22 and the second side cargo wall 24 can also optionally be fitted with additional accessory attachment tracks 30. As shown in FIG. 1, each accessory attachment track 30 can be concealed with a cover C that slides into the accessory attachment track 30, covering the elongated slot formed in the accessory attachment track 30 (shown in an installed state in FIG. 23). The accessory attachment track 30 is a feature that is described in greater detail in, for example, U.S. Pat. No. 6,846,140 to Anderson et al., issued Jan. 25, 2005. U.S. Pat. No. 6,846,140 is incorporated herein by reference in its entirety.

The tailgate 16 has a first end 36, a second end 38, a first surface 40 and a second surface 42. The first end 36 is pivotally attached to a rear of the cargo area 14 for pivoting movement between a closed position (FIGS. 1 and 3) covering the tailgate opening 26 and an open position (FIGS. 2 and 4) exposing the tailgate opening 26. In the closed position, the tailgate 16 is in a generally upright or vertical orientation with the first end 36 facing downward and the second end 38 facing upward. In the open position, the tailgate 16 is in a generally horizontal or inclined orientation with the first end 36 facing a rear end 44 of the cargo area 14 and the second end 38 facing rearward. The gap G is defined between the rear end 44 of the bed floor 20 and the first end 36 of the tailgate 16, in particular when the tailgate 16 is in the open position.

A description of the tailgate gap cover 12 is now provided with reference to FIGS. 2-8. The tailgate gap cover 12 basically includes a main portion 50 and two hinge assemblies 52. In the first embodiment, the tailgate gap cover 12 is fastened to the accessory attachment track 30 proximate the rear end 44 of the cargo area 12 such that the tailgate gap cover 12 pivots between a horizontal orientation (FIGS. 4 and 7) with the tailgate 16 in the open position and an upright orientation (FIG. 3) with the tailgate 16 in the closed position. In both positions, the tailgate gap cover 12 covers the gap G.

Figure 5:
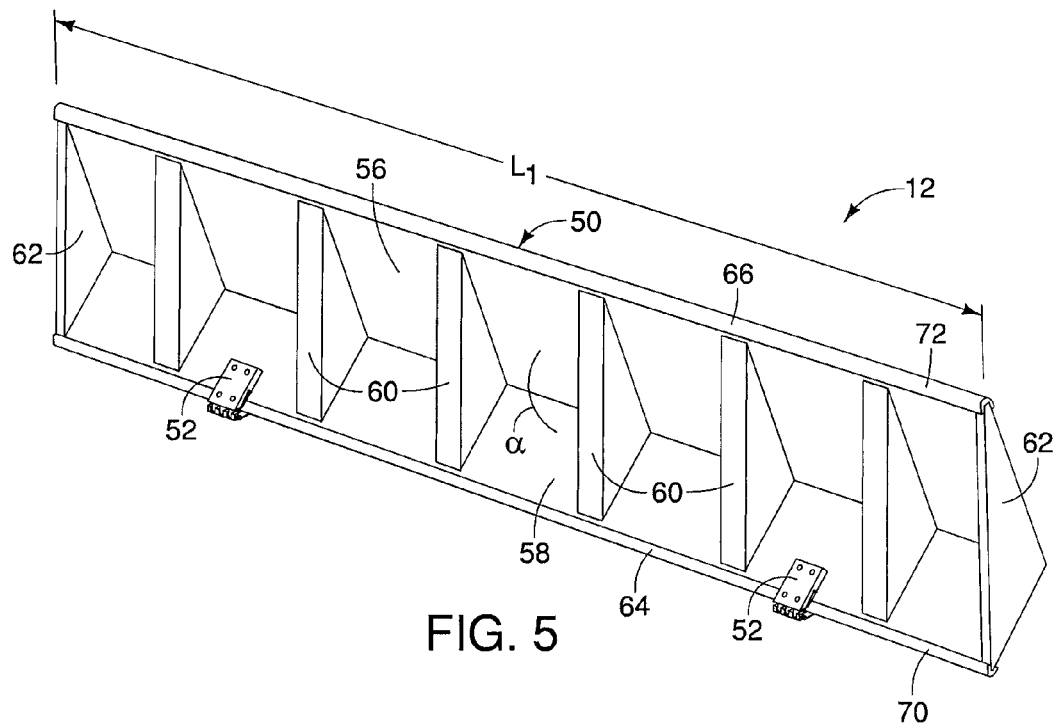
FIG. 5 is a perspective view of the tailgate gap cover removed from the cargo area showing a main portion and a pair of hinge assemblies in accordance with the first embodiment.

As shown in FIGS. 5 and 7, the main portion 50 of the tailgate gap cover 12 has a first planar portion 56, a second planar portion 58, a plurality of ribs 60 and end caps 62. The first planar portion 56 and the second planar portion 58 each have an overall length $L_1$ that is approximately a length $L_2$ (in a vehicle lateral direction) of the tailgate 16, as indicated in FIGS. 2 and 7. However, the length $L_2$ of the tailgate 16 is slightly larger than the length $L_1$. As shown in FIG. 7, the first planar portion 56 defines a first planar surface 56*a* and the second planar portion 58 defines a second planar surface 58*a*.

The ribs 60 are stiffening ribs that extend in a direction perpendicular to the length $L_1$ of the main portion 50 from the first planar portion 56 to the second planar portion 58. The first and second planar portions 56 and 58 are made of metal with the ribs 60 welded thereto. Further, the first and second planar portions 56 and 58 can be made, for example, as a single metal plate that is bent slightly such that the first planar portion 56 is slightly angularly offset from the second planar portion 58. More specifically, an angle α (FIGS. 5 and 10) can be defined between the first planar surface 56*a* and the second planar surface 58*a*. The angle α can range between 175 degrees and 160 degrees. In the depicted embodiment, the angle α is approximately 160 degrees, but can be 165 degrees, 170 degrees, 175 degrees or greater, or any angle less than 180 degrees and greater than 160 degrees. The angle α is preferably such that the first planar surface 56*a* and the second planar surface 58*a* are almost parallel to one another. The angle α is also preferably such that at least one of the first planar surface 56*a* and the second planar surface 58*a* is approximately parallel to the first surface 40 of the tailgate 16 with the tailgate 16 in the open position and the tail gate gap cover 12 being positioned to lie on the tailgate 16, as shown in FIG. 2. In other words, the angle α is preferably as close to 180 degrees as possible. It should be understood from the drawings and the description herein that the angle α is depicted in the drawings in an exaggerated manner, and need not be very large.

The end caps 62 are metal plates that are, for example, welded to opposite lateral ends of the first planar portion 56 and the second planar portion 58, at least partially closing the lateral ends of tailgate gap cover 12.

It should be understood from the drawings and the description herein that the main portion 50 can be completely flat with the ribs 60 being omitted.

The tailgate gap cover 12 also has a forward peripheral edge 64 and a rearward peripheral edge 66. The forward peripheral edge 64 defines a cargo bed floor contacting portion and the rearward peripheral edge 66 defines a tailgate contacting edge portion.

The forward peripheral edge 64 is fitted with a flexible seal member 70 and the rearward peripheral edge 66 is similarly fitted with a flexible seal member 72. The flexible seal member 70 of the forward peripheral edge 64 contacts the bed floor 20 of the cargo area 14 while the flexible seal member 72 of the rearward peripheral edge 66 contacts the first surface 40 of the tailgate 16 with the tailgate gap cover 12 installed to the cargo area 14, as shown in FIGS. 2-4.

Figure 6:
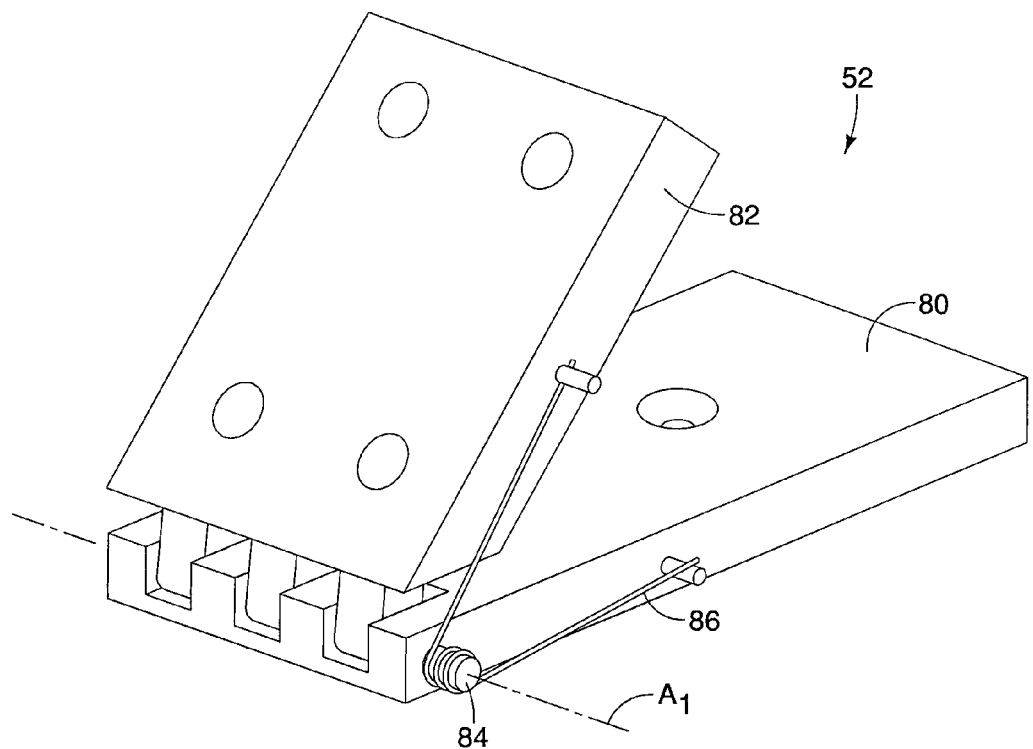
FIG. 6 is a perspective view of one of the hinge assemblies in accordance with the first embodiment.

A description of the hinge assemblies 52 is now provided with specific reference to FIG. 6. There are two of the hinge assemblies 52 in the first embodiment. Since the hinge assemblies 52 are identical to one another, only one hinge assembly 52 is described hereinbelow for the sake of brevity.

Figure 8:
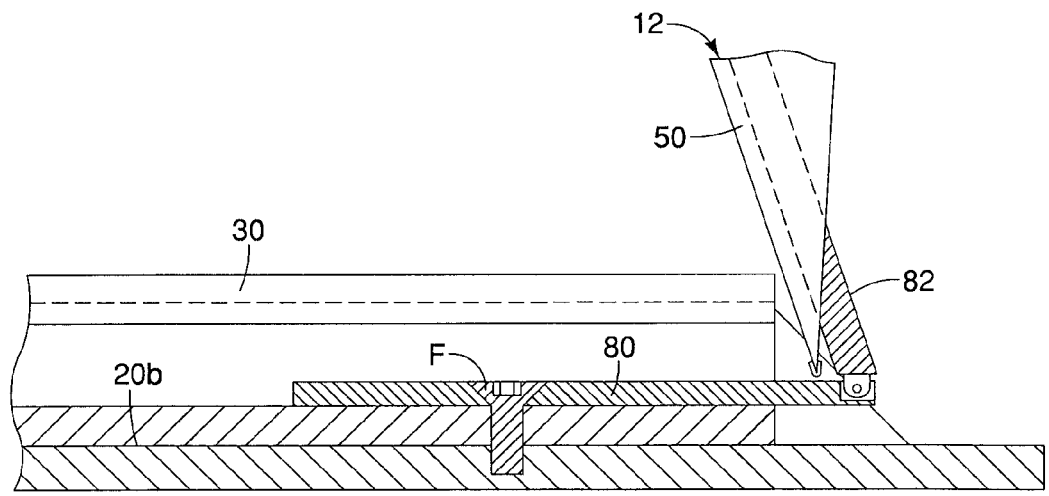
FIG. 8 is a side cross-sectional view of the bed floor of the cargo area showing the hinge assembly of the tailgate gap cover attached to the accessory attachment track in accordance with the first embodiment.

The hinge assembly 52 shown in FIG. 6 includes an attachment projection 80, a bracket 82, a pivot pin 84 and at least one biasing spring 86. The attachment projection 80 is an elongated plate shaped element that is dimensioned for insertion into one of the accessory attachment tracks 30 and fastened to the accessory attachment track 30 via a removable fastener F, as indicated in FIGS. 7 and 8. The bracket 82 constitutes a main portion of the hinge assembly 52 and is attached to the tailgate gap cover 12 via fasteners that can be removable or permanent. The bracket 82 can alternatively be welded to the tailgate gap cover 12.

As shown in FIG. 6, the attachment projection 80 is connected to the bracket 82 (the main portion) by the pivot pin 84. The pivot pin 84 defines a pivot axis $A_1$ about which the attachment projection 80 and the bracket 82 pivot relative to one another. Further, with the tailgate gap cover 12 attached to the accessory attachment tracks 30, the tailgate gap cover 12 pivots about the pivot axis $A_1$. Hence, when the tailgate 16 is moved between the open position and the closed position, the tailgate gap cover 12 can pivot about the pivot axis $A_1$ thereby moving with the tailgate 16 between the positions depicted in FIGS. 3 and 4.

The biasing spring 86 is depicted as being wound around a portion of the pivot pin 84 in order to bias the hinge assembly 52 to urge the tailgate gap cover 12 into contact with the tailgate 16. The biasing spring 86 has a first end 86a that is restrained relative to the attachment projection 80 and a second end 86b that is restrained relative to the bracket 82 thereby imparting a biasing force on the hinge assembly 52 and the tailgate gap cover 12. Hence, the bracket 82, which is attached to the main portion 50 of the tailgate gap cover 12, is spring biased relative to the attachment projection 80 such that the main portion 50 of the tailgate gap cover 12 is urged into contact with tailgate 16.

Hence, in the first embodiment the tailgate gap cover 12 covers the gap G regardless of the position of the tailgate 16. The tailgate gap cover 12 moves with the movement of the tailgate 16 due to the spring biasing of the hinge assembly 52.

It should be understood from the drawings and the description herein that the biasing spring 86 can be configured in any of a variety of different ways, and need not be configured as depicted in the drawings. For example, the biasing spring 86 can be hidden within the hinge assembly 52 or can include a plurality of springs in order to increase the level of biasing force applied to the hinge assembly 52 and the tailgate gap cover 12. Further, there can be two or more springs installed to each of the hinge assemblies 52.

As indicated in FIG. 5, the ribs 60 extend in a direction that is parallel to the attachment projections 80.

It should be understood from the drawings and the description herein that the tailgate gap cover 12 is removable from the cargo area 14 or, alternatively, can be a permanently installed accessory. As well, the hinge assemblies 52 can alternatively include locking mechanism (not shown) that lock the tailgate gap cover 12 in the upright orientation depicted in FIG. 3. An example of such a locking mechanism is shown in subsequently described embodiments.

Second Embodiment

Referring now to FIGS. 9-21, a tailgate gap cover 112 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

Figure 9:
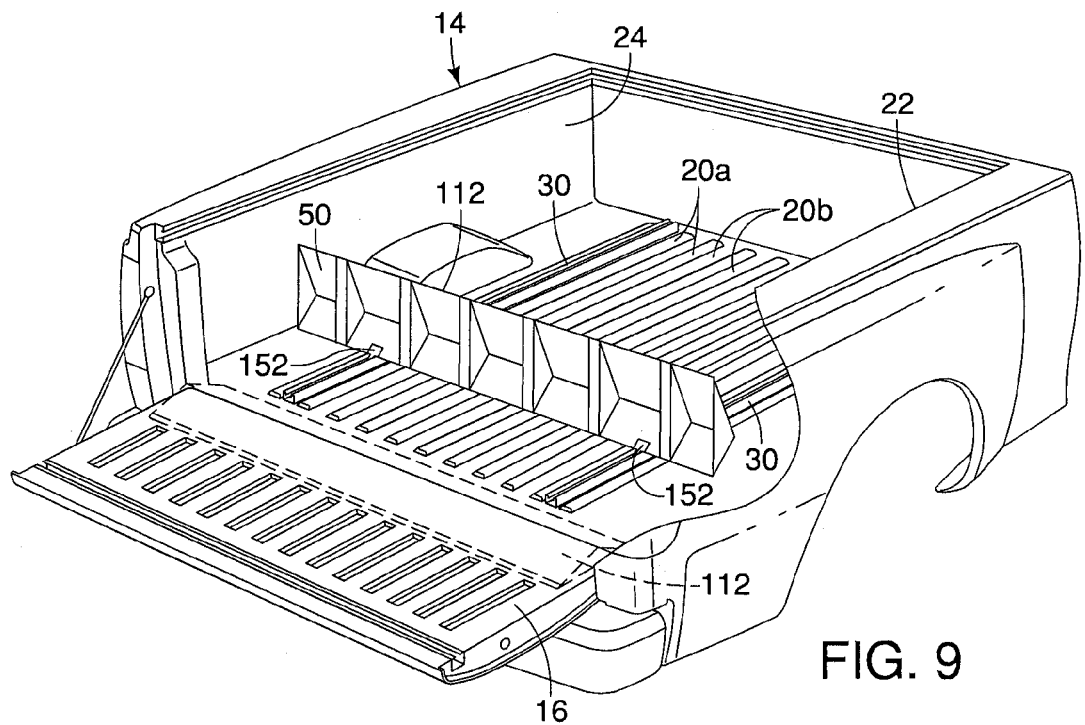
FIG. 9 is a perspective view of a cargo area of a vehicle showing a tailgate gap cover in phantom covering the gap between the bed floor and the tailgate, and showing the tailgate gap cover moved to a cargo retaining position spaced apart from the tailgate in accordance with a second embodiment.

The tailgate gap cover 112 is specifically modified relative to the tailgate gap cover 12 in that it is moveable along the accessory attachment tracks 30, as indicted in FIG. 9. Specifically, the tailgate cap cover 112 can be moved from a gap covering orientation shown in phantom in FIG. 9 to a cargo retaining orientation shown in solid lines in FIG. 9.

Figure 10:
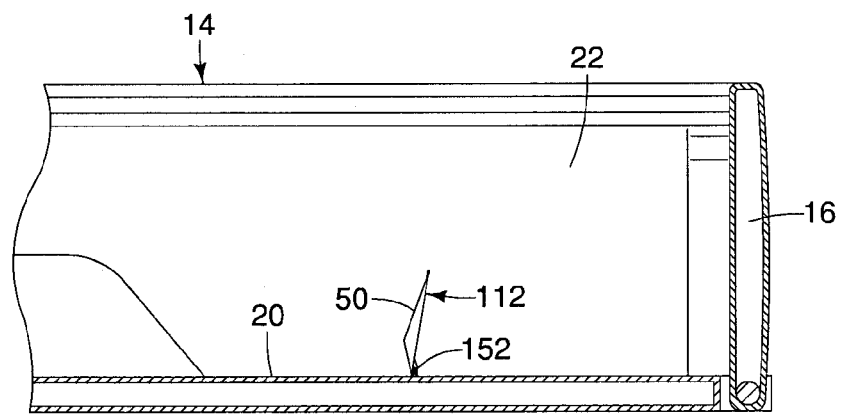
FIG. 10 is a side view the cargo area showing the tailgate gap cover in the upright orientation and moved to the cargo retaining position in accordance with the second embodiment.

In the second embodiment the tailgate gap cover 112 includes the main portion 50 described above with respect the first embodiment. However, a pair of hinge assemblies 152 replaces the hinge assemblies 52 of the first embodiment. The hinge assemblies 152 include features that allow for movement of the tailgate gap cover 112 along the accessory attachment tracks 30, and they include structure that releasably locks the main portion 50 in an upright or vertical orientation, as shown in FIGS. 9-11.

The tailgate gap cover 112 includes two hinge assemblies 152 that are basically the same. Description of one applies equally to both of the hinge assemblies 152. Therefore only one of the hinge assemblies 152 is described for the sake of brevity.

Figure 11:
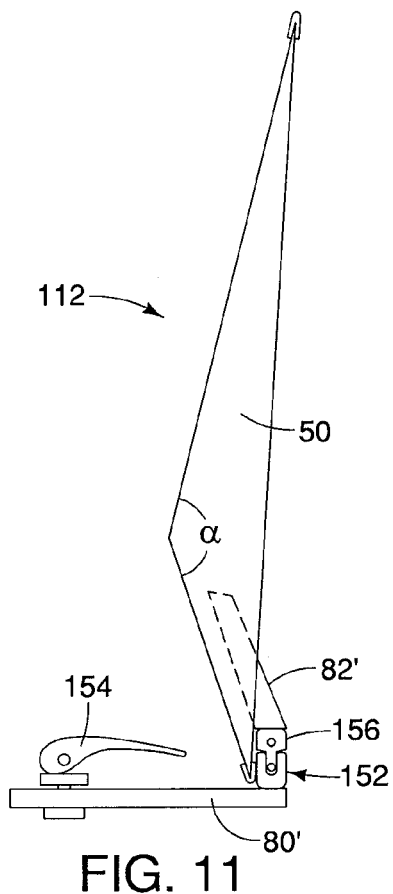
FIG. 11 is a side view of the tailgate gap cover showing a hinge assembly that includes a quick-release mechanism and a locking hinge mechanism, with the locking hinge mechanism in a locked upright orientation in accordance with the second embodiment.
Figure 12:
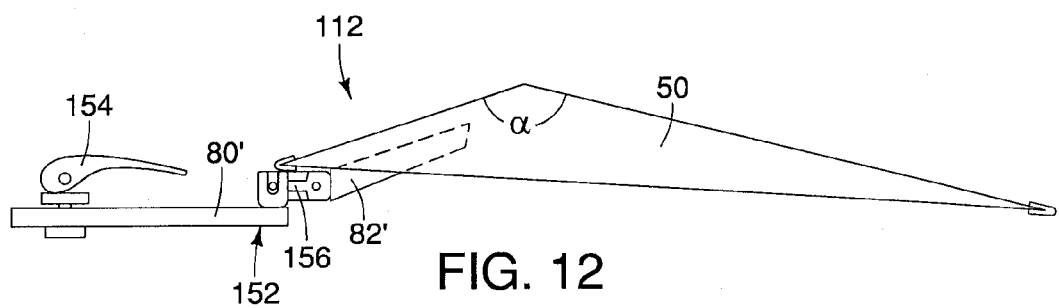
FIG. 12 is another side view of the tailgate gap cover showing the quick-release mechanism and the locking hinge mechanism of the hinge assembly, with the locking hinge mechanism in an unlocked horizontal orientation in accordance with the second embodiment.

As shown in FIGS. 11 and 12, the hinge assembly 152 includes an attachment projection 80', a bracket 82', a quick-release mechanism 154 and a locking hinge mechanism 156.

The attachment projection 80' is an elongated plate element, similar to the attachment projection 80 in that it is dimensioned to slide into one of the accessory attachment tracks 30. The bracket 82' is a plate element that attaches to the main portion 50 in a manner similar to the bracket 82 of the first embodiment. The attachment projection 80' and the bracket 82' are fixedly attached to the locking hinge mechanism 156, which is described in greater detail below.

Figure 13:
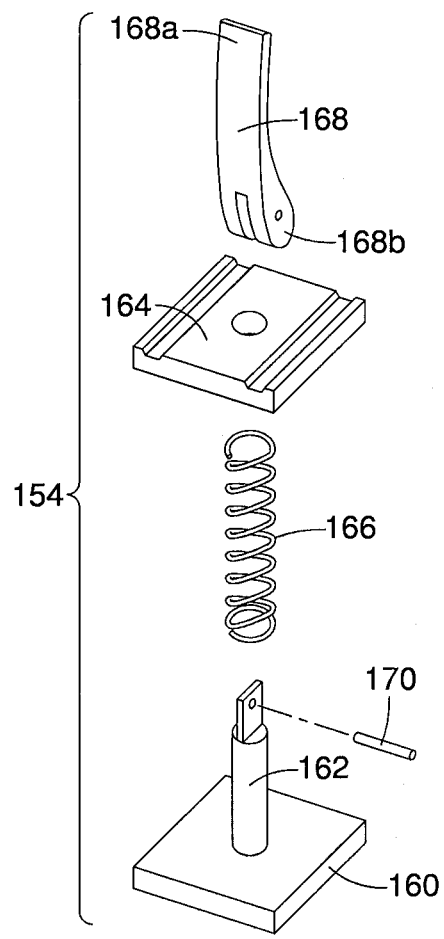
FIG. 13 is an exploded perspective view of the quick-release mechanism removed from the hinge assembly of the tailgate gap cover showing elements of the quick-release mechanism in accordance with the second embodiment.
Figure 14:
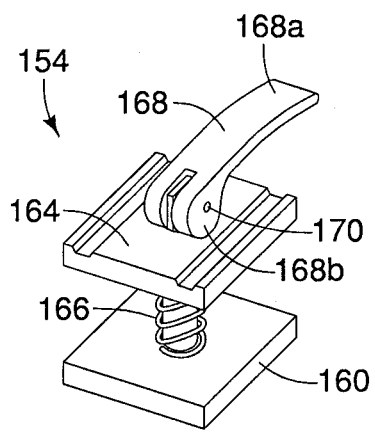
FIG. 14 is a perspective view of the quick-release mechanism showing the quick-release mechanism in a locking or clamping orientation in accordance with the second embodiment.
Figure 15:
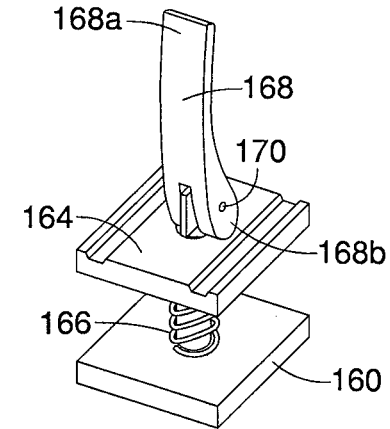
FIG. 15 is another perspective view of the quick-release mechanism showing the quick-release mechanism in an unlocking or releasing orientation in accordance with the second embodiment.
Figure 16:
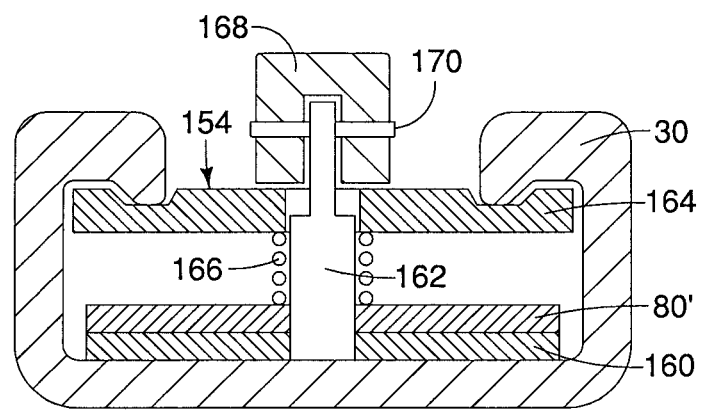
FIG. 16 is a cross-sectional view of the accessory attachment track with the tailgate gap cover installed, showing the quick-release mechanism in the locking or clamping orientation in accordance with the second embodiment.
Figure 17:
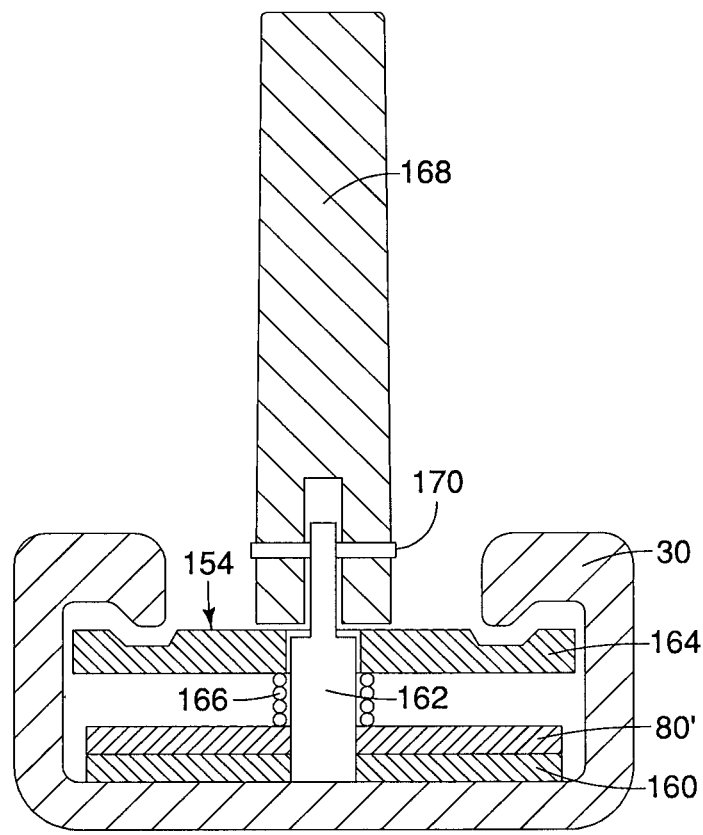
FIG. 17 is another cross-sectional view of the accessory attachment track with the tailgate gap cover installed similar to FIG. 16, showing the quick-release mechanism in the unlocking or releasing orientation in accordance with the second embodiment.

The quick-release mechanism 154 is now described with specific reference to FIGS. 13-17. In FIG. 13 the quick-release mechanism 154 is shown in an exploded view. The quick-release mechanism 154 basically includes a bottom plate 160, a shaft 162, an upper plate 164, a biasing spring 166 and a quick-release lever 168. The shaft 162 is fixed to a central area of the bottom plate 160 and extends through an aperture in the upper plate 164 such that the upper plate 164 is movable along the shaft 162. As shown in FIGS. 16 and 17, the attachment projection 80' also includes an aperture with the shaft 162 extending through the aperture such that the attachment projection 80' is disposed between the bottom plate 160 and the upper plate 164.

The biasing spring 166 is disposed on the shaft 162 between the bottom plate 160 and the attachment projection 80', with the upper plate 164 being located below the attachment projection 80'.

The release lever 168 has a lever end 168a and a cam end 168b. The cam end 168b of the release lever 168 is fixed to an upper end of the shaft 162 by a pivot pin 170 such that the release lever 168 pivots about the pivot pin 170 relative to the shaft 162. The release lever 168 pivots between a locking orientation shown in FIGS. 11-14 and 16 and a releasing orientation shown in FIGS. 15 and 17. The cam end 168b is cam-shaped, with the pivot pin 170 being off center relative to the cam shape of the cam end 168b.

When installed to the attachment projection 80' and the tailgate gap cover 112, and with the quick-release mechanism 154 inserted into one of the accessory attachment tracks 30, the quick-release mechanism 154 operates as follows. In the releasing orientation shown in FIG. 17, the cam end 168d of the release lever 168 imparts a compressing force against the biasing spring 166, moving the upper plate 164 downward along the shaft 162, thereby reducing the distance between the upper plate 164 and the bottom plate 160. In this orientation the tailgate gap cover 112 can be moved relative to the accessory attachment track 30 and the cargo area 14 of the vehicle 10. In the locking orientation shown in FIG. 16, the biasing spring 166 urges the upper plate 164 into engagement with upper inner surfaces of the accessory attachment track 30 and the bottom plate 160 into a lower inner surface of the accessory attachment track 30. Thus, the quick-release mechanism 154 basically clamps the tailgate gap cover 112 into position relative to the accessory attachment track 30 and the cargo area 14.

Further, in the locking orientation as shown in FIG. 16, the release lever 168 is almost flush with an upper outer surface of the accessory attachment track 30. Therefore, the release lever 168 is barely noticeable along the bed floor 20 of the cargo area 14 and does not interfere with normal usage of the cargo area 14.

Figure 20:
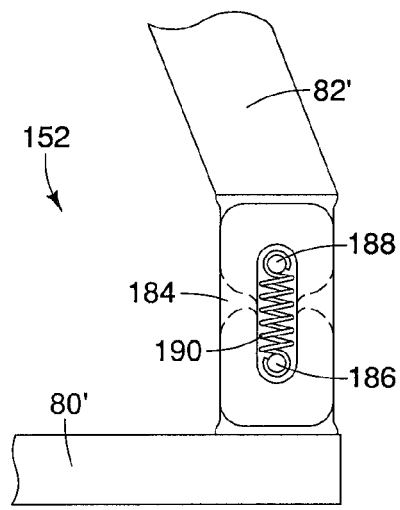
FIG. 20 is a cutaway side view of the locking hinge mechanism showing the connector and its connection to various other elements of the locking hinge mechanism in accordance with the second embodiment.

The locking hinge mechanism 156 is now described with specific reference to FIGS. 18-21. The locking hinge mechanism 156 basically includes a lower block 180, an upper block 182, a connector 184, a first pin 186, a second pin 188 and a spring 190 (FIG. 20). In each locking hinge mechanism 156 there are two lower blocks 180 and two upper blocks 182. Only one lower block 180 and one upper block 182 are clearly shown in FIGS. 18-21, but description of one pair applies equally to the other pair.

The lower block 180 is fixedly attached by fasteners or welding to the attachment projection 80'. The lower block 180 includes a recess 180a and an opening that receives the first pin 186. The upper block 182 is fixedly attached by fasteners or welding to the bracket 82'. The upper block 182 includes an opening that receives the second pin 188 and a projection 182a that is dimensioned to removably extend into the recess 180a of the lower block 180.

The connector 184 is a rectangular member with an elongated slot 184a extending therethrough. As shown in FIG. 20, the first pin 186 and the second pin 188 extend through the elongated slot 184a of the connector 184. Further, the spring 190 extends between the first pin 186 and the second pin 188 within the elongated slot 184a of the connector 184.

Figure 18:
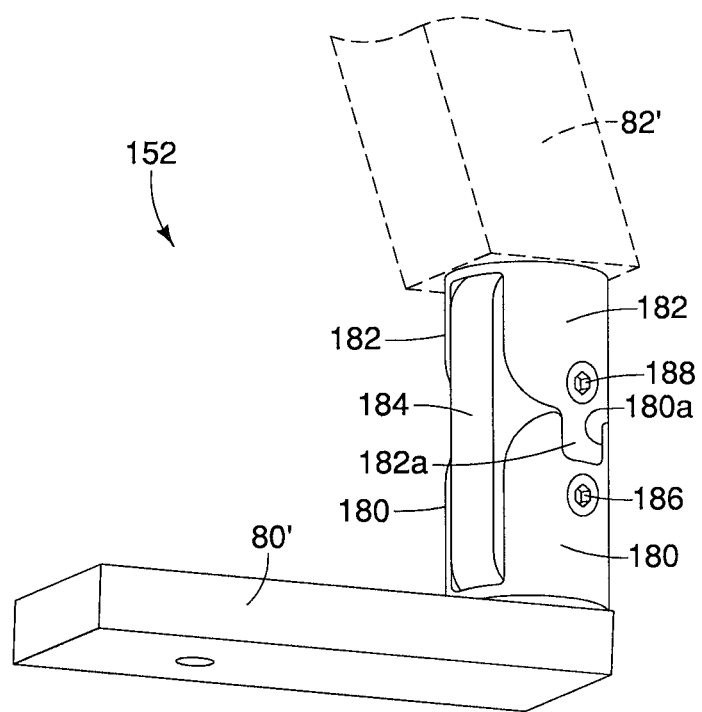
FIG. 18 is a perspective view of the locking hinge mechanism removed from the tailgate gap cover, showing the locking hinge mechanism in the locking or clamping orientation in accordance with the second embodiment.
Figure 19:
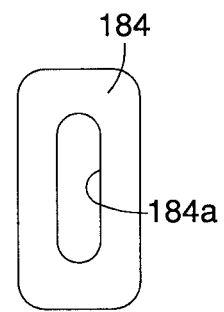
FIG. 19 is a side view of a connector of the locking hinge mechanism, shown removed therefrom in accordance with the second embodiment.
Figure 21:
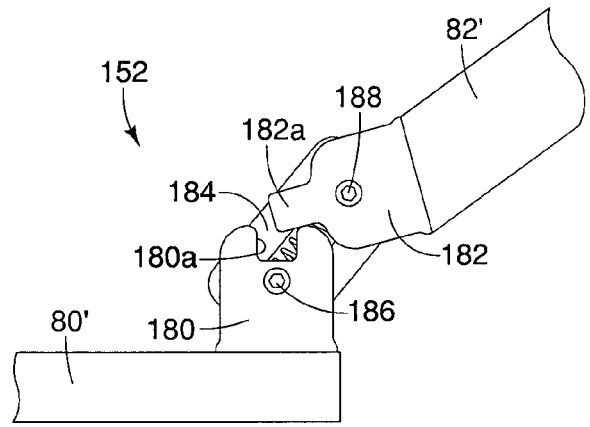
FIG. 21 is another side view of the locking hinge mechanism showing the locking hinge mechanism moved to an unlocked orientation in accordance with the second embodiment.

As indicated in FIGS. 18 and 20, when the projection 182a of the upper block 180 is inserted into the recess 180a of the lower block 180, the tailgate gap cover 112 is locked in the upright position, as shown in FIGS. 9-11. As indicated in FIG. 21, when the attachment projection 80' and/or the tailgate gap cover 112 is pulled upward relative to the attachment projection 80' and angled rearward (to the right side of FIG. 21), the projection 182a moves out of the recess 180a, and the tailgate gap cover 112 can move easily between the upright orientation and the inclined orientation (horizontal) in order to be used to cover the gap G.

Third Embodiment

Figure 22:
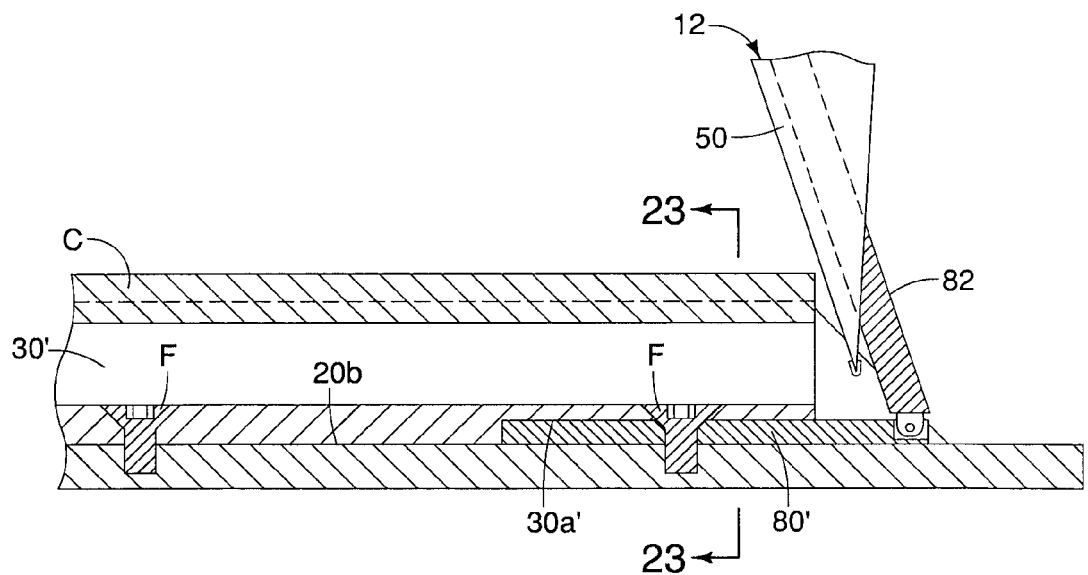
FIG. 22 is a side cross-sectional view of the bed floor of the cargo area showing the hinge assembly of the tailgate gap cover attached to the accessory attachment track and the bed floor of the cargo area within a recess formed at a lower surface of the accessory attachment track in accordance with a third embodiment.
Figure 23:
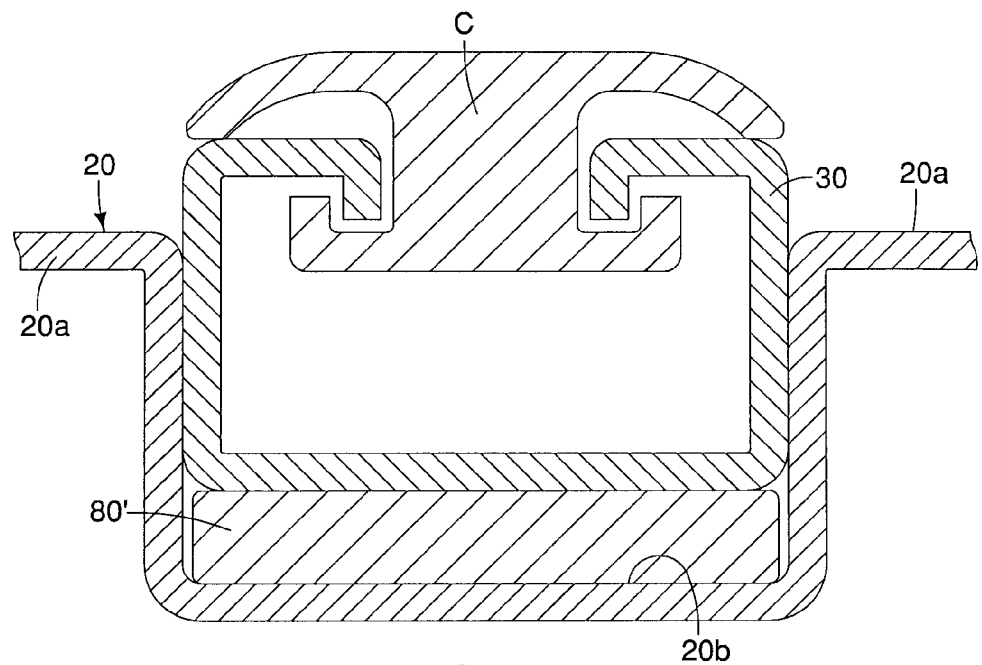
FIG. 23 is a cross-sectional view of the bed floor, the accessory attachment track and an attachment projection of the hinge assembly of the tailgate gap cover taken along the line 23-23 in FIG. 22 in accordance with a third embodiment.

Referring now to FIGS. 22 and 23, a modified configuration of the tailgate gap cover 12 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. The parts of the second embodiment that differ from the parts of the first embodiment will be indicated with a single prime (').

In the third embodiment the accessory attachment track 30 of the first embodiment is replaced with an accessory attachment track 30' that includes a recessed area 30a' dimensioned to receive an attachment projection 80' that has been modified to fit in the recessed area 30a'. A fastener F retains the accessory attachment track 30' and the attachment projection 80' to the bed floor 20 of the cargo area 14. In this embodiment the cover C and other track accessories (not shown) can easily be inserted into an end of the accessory attachment track 30' without interference from the attachment projection 80'.

Fourth Embodiment

Figure 24:
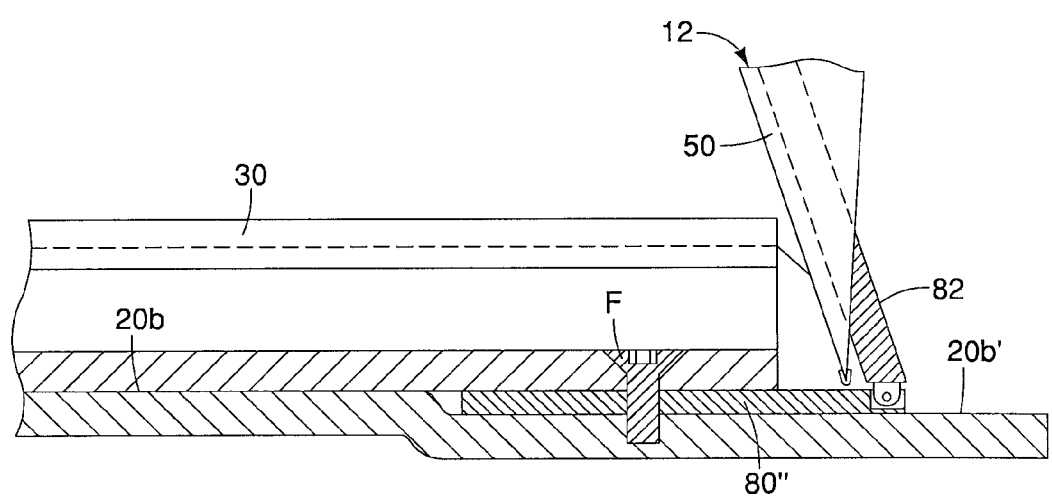
FIG. 24 is a side cross-sectional view of the bed floor of the cargo area showing the hinge assembly of the tailgate gap cover attached to the accessory attachment track and the bed floor of the cargo area within a recess formed along the bed floor in accordance with a fourth embodiment.

Referring now to FIG. 24, a modified configuration of the tailgate gap cover 12 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity. The parts of the second embodiment that differ from the parts of the first embodiment will be indicated with a double prime (").

In the fourth embodiment the bed floor 20 of the cargo area 14 is modified to include a recessed area 20b' dimensioned to receive an attachment projection 80" that has been modified to fit in the recessed area 20b'. A fastener F retains the accessory attachment track 30 and the attachment projection 80" to the bed floor 20 of the cargo area 14. In this embodiment the cover C can easily be inserted into and end of the accessory attachment track 30 without interference from the attachment projection 80" in a manner similar to that shown in FIG. 23.

The various components of the cargo area 14 of the vehicle 10 (other than the tailgate gap cover 12) are conventional components that are well known in the art. Since these components are well known in the art, these structures will not be discussed or illustrated in detail herein. Rather, it will be apparent to those skilled in the art from this disclosure that the components can be any type of structure that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle cargo area accessory. Accordingly, these terms, as utilized to describe the present invention should be interpreted relative to a vehicle equipped with the vehicle cargo area accessory.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle cargo bed structure and tailgate accessory comprising
    a vehicle cargo area including a bed floor, a first side cargo wall and a second side cargo wall, with a tailgate opening being defined at rearward ends of the first and second cargo walls;
    an accessory attachment track attached to the bed floor, the accessory attachment track extending in a vehicle longitudinal direction;
    a tailgate having a first end pivotally attached to a rear of the vehicle cargo area for pivoting movement between a closed position covering the tailgate opening between the first side cargo wall and the second side cargo wall and an open position exposing the tailgate opening, with a gap being defined between a rear end of the bed floor and the first end of the tailgate; and
    a tailgate gap cover directly attached to the accessory attachment track such that the tailgate gap cover is removable and re-attachable to the accessory attachment track, the tailgate gap cover further being movable to pivot between a horizontal orientation with the tailgate in the open position and an upright orientation with the tailgate in the closed position, with the tailgate gap cover covering the gap with the tailgate in the open position.

2. The vehicle cargo bed structure and tailgate accessory according to claim 1, wherein
    the tailgate gap cover is also directly attached to the bed floor of the vehicle cargo area.

3. The vehicle cargo bed structure and tailgate accessory according to claim 1, wherein
    the tailgate gap cover is directly attached to an underside of the accessory attachment track.

4. The vehicle cargo bed structure and tailgate accessory according to claim 1, wherein
    the bed floor includes a recess with the accessory attachment track being located at least partially within the recess of the bed floor.

5. The vehicle cargo bed structure and tailgate accessory according to claim 1, wherein
    the tailgate gap cover includes a main portion having a planar surface and at least one attachment projection coupled to the accessory attachment track, the at least one attachment projection being connected to the main portion via a hinge structure.

6. The vehicle cargo bed structure and tailgate accessory according to claim 5, wherein
    the at least one attachment projection of the tailgate gap cover is removably attached to the accessory attachment track.

7. The vehicle cargo bed structure and tailgate accessory according to claim 5, wherein
    the at least one attachment projection of the tailgate gap cover is attached to an underside of the accessory attachment track.

8. The vehicle cargo bed structure and tailgate accessory according to claim 5, wherein
    the planar surface of the main portion of the tailgate gap cover is approximately parallel to an interior surface of the tailgate with the tailgate in the open position.

9. The vehicle cargo bed structure and tailgate accessory according to claim 5, wherein
    the main portion of the tailgate gap cover includes a plurality of stiffening ribs that extend parallel to the at least one attachment projection.

10. The vehicle cargo bed structure and tailgate accessory according to claim 5, wherein
    the tailgate gap cover includes an attachment mechanism that removably attaches the at least one attachment projection to the accessory attachment track such that the tailgate gap cover is positionable at any one of a plurality of locations along a lengthwise direction of the accessory attachment track.

11. The vehicle cargo bed structure and tailgate accessory according to claim 5, wherein
    the main portion of the tailgate gap cover includes an outer peripheral edge that includes a tailgate contacting edge portion and a bed floor contacting edge portion, with the tailgate contacting edge portion of the main portion of the tailgate gap cover including a flexible seal member attached thereto that contacts the tailgate.

12. The vehicle cargo bed structure and tailgate accessory according to claim 11, wherein
    the main portion is spring biased relative to the at least one attachment projection such that the main portion is urged into contact with tailgate.

13. The vehicle cargo bed structure and tailgate accessory according to claim 12, wherein
    the bed floor contacting edge portion has a flexible seal member attached thereto that contacts the bed floor.

14. The vehicle cargo bed structure and tailgate accessory according to claim 5, wherein
the main portion is spring biased relative to the at least one attachment projection such that the main portion is urged into contact with tailgate.

15. The vehicle cargo bed structure and tailgate accessory according to claim 1, wherein
the tailgate gap cover is spring biased into contact with tailgate.

16. A vehicle cargo bed structure and tailgate accessory comprising
a vehicle cargo area including a bed floor, a first side cargo wall and a second side cargo wall, with a tailgate opening being defined at rearward ends of the first and second cargo walls;
an accessory attachment track attached to the bed floor, the accessory attachment track extending in a vehicle longitudinal direction;
a tailgate having a first end pivotally attached to a rear of the vehicle cargo area for pivoting movement between a closed position covering the tailgate opening between the first side cargo wall and the second side cargo wall and an open position exposing the tailgate opening, with a gap being defined between a rear end of the bed floor and the first end of the tailgate; and
a tailgate gap cover including an attachment mechanism that is removably attached to the accessory attachment track proximate the rear end, the tailgate gap cover being movable to pivot about an axis extending through the attachment mechanism between a horizontal orientation with the tailgate in the open position and an upright orientation with the tailgate in the closed position, with the tailgate gap cover covering the gap with the tailgate in the open position, and attachment mechanism being configured such that the tailgate gap cover is movable along the accessory attachment track such that the tailgate gap cover is additionally positionable at any one of a plurality of locations along a lengthwise direction of the accessory attachment track.

17. The vehicle cargo bed structure and tailgate accessory according to claim 16, wherein
the tailgate gap cover is spring biased relative to the attachment mechanism such that the tailgate gap cover is urged to move to the horizontal orientation.

18. A vehicle cargo bed structure and tailgate comprising
a vehicle cargo area including a bed floor, a first side cargo wall and a second side cargo wall, with a tailgate opening being defined at rearward ends of the first and second cargo walls;
an accessory attachment track attached to the bed floor, the accessory attachment track extending in a vehicle longitudinal direction;
a tailgate having a first end pivotally attached to a rear of the vehicle cargo area for pivoting movement between a closed position covering the tailgate opening between the first side cargo wall and the second side cargo wall and an open position exposing the tailgate opening, with a gap being defined between a rear end of the bed floor and the first end of the tailgate; and
a tailgate gap cover coupled to the accessory attachment track proximate the rear end, the tailgate gap cover being movable to pivot between a horizontal orientation with the tailgate in the open position and an upright orientation with the tailgate in the closed position, with the tailgate gap cover covering the gap with the tailgate in the open position, the tailgate gap cover including a main portion having a planar surface and at least one attachment projection coupled to the accessory attachment track, the at least one attachment projection being connected to the main portion via a hinge structure, the hinge structure including a locking mechanism that locks the main portion in the upright orientation with the tailgate gap cover installed to the accessory attachment track and with the tailgate in the open position.

19. The vehicle cargo bed structure and tailgate accessory according to claim 18, wherein
the main portion of the tailgate gap cover is spring biased relative to the at least one attachment projection such that the main portion is urged to move to the horizontal orientation.

* * * * *